United States Patent
Lan et al.

(10) Patent No.: US 10,901,414 B2
(45) Date of Patent: Jan. 26, 2021

(54) SYSTEMS AND METHODS FOR PROVIDING REDUNDANCY TO ELECTRONIC SPEED CONTROL SYSTEMS

(71) Applicant: SZ DJI TECHNOLOGY CO., LTD., Shenzhen (CN)

(72) Inventors: Qiu Lan, Shenzhen (CN); Changxing Zhou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/358,125

(22) Filed: Mar. 19, 2019

(65) Prior Publication Data

US 2019/0212733 A1     Jul. 11, 2019

Related U.S. Application Data

(63) Continuation of application No. PCT/CN2016/099435, filed on Sep. 20, 2016.

(51) Int. Cl.
*G05D 1/00* (2006.01)
*B64C 39/02* (2006.01)
(Continued)

(52) U.S. Cl.
CPC ......... *G05D 1/0077* (2013.01); *B64C 39/024* (2013.01); *G05D 1/0072* (2013.01); *H02P 7/00* (2013.01); *H02P 7/063* (2013.01); *H02P 27/08* (2013.01); *H02P 29/032* (2016.02); *B64C 2201/042* (2013.01); *H02P 27/085* (2013.01);
(Continued)

(58) Field of Classification Search
CPC ..... G05D 1/0077; Y02T 50/44; B64C 13/503; B64C 39/024; B64D 27/24
See application file for complete search history.

(56) References Cited

U.S. PATENT DOCUMENTS

| | | | | |
|---|---|---|---|---|
| 2009/0128072 A1* | 5/2009 | Strong | ............ | H02P 27/08 |
| | | | | 318/400.17 |
| 2015/0288304 A1* | 10/2015 | Chappell | ............ | H02H 7/08 |
| | | | | 318/400.21 |

(Continued)

FOREIGN PATENT DOCUMENTS

| CN | 203786564 U | 8/2014 |
|---|---|---|
| CN | 104914872 A | 9/2015 |

(Continued)

OTHER PUBLICATIONS

The World Intellectual Property Organization (WIPO) International Search Report and Written Opinion for PCT/CN2016/099435 dated Mar. 29, 2017 6 Pages.

*Primary Examiner* — Zoheb S Imtiaz
(74) *Attorney, Agent, or Firm* — Anova Law Group, PLLC (57) ABSTRACT

A method for driving an electric motor includes providing two controllers for driving the electric motor. The two controllers use different control methods to drive the electric motor. The method further includes selecting a first controller of the controllers as a primary controller to drive the electric motor and a second controller of the controllers as a secondary controller, monitoring a control of the electric motor, and switching the control of the electric motor from the primary controller to the secondary controller if an error condition is detected in the control of the electric motor.

20 Claims, 7 Drawing Sheets

(51) Int. Cl.
*H02P 27/08* (2006.01)
*H02P 7/00* (2016.01)
*H02P 29/032* (2016.01)
*H02P 7/06* (2006.01)

(52) U.S. Cl.
CPC ...... *H02P 2201/00* (2013.01); *H02P 2209/07* (2013.01); *H02P 2209/11* (2013.01); *H02P 2209/13* (2013.01)

(56) References Cited

U.S. PATENT DOCUMENTS

| | | | |
|---|---|---|---|
| 2015/0291279 A1* | 10/2015 | Iordanidis | F16D 65/14 188/156 |
| 2016/0052620 A1* | 2/2016 | Hussey | B64C 13/40 244/227 |
| 2016/0149534 A1* | 5/2016 | Guo | B60L 15/007 318/461 |
| 2018/0237148 A1* | 8/2018 | Hehn | B64C 39/024 |
| 2020/0231047 A1* | 7/2020 | Demont | H02P 29/028 |

FOREIGN PATENT DOCUMENTS

| | | |
|---|---|---|
| CN | 104914874 A | 9/2015 |
| CN | 204965188 U | 1/2016 |
| CN | 204989980 U | 1/2016 |

* cited by examiner

SYSTEMS AND METHODS FOR PROVIDING REDUNDANCY TO ELECTRONIC SPEED CONTROL SYSTEMS

CROSS-REFERENCE TO RELATED APPLICATION

This application is a continuation of International Application No. PCT/CN2016/099435, filed on Sep. 20, 2016, the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

TECHNICAL FIELD

The present disclosure relates generally to electronic speed controllers and, more particularly, to systems and methods of providing redundancy in electronic speed control systems.

BACKGROUND

An electronic speed controller ("ESC") is often an essential component of an electronic speed control system. The ESC, for example, may function as an interface between other controller circuitry and an electric motor. The ESC may convert control signals or instructions that it receives from another controller into a corresponding set of one or more signals that drive the electric motor. Thus, the ESC may control the electric motor's speed, acceleration, torque, and/or direction by varying the power and phase of the drive signals that it applies to the electric motor.

An ESC is often used to control motors in unmanned aerial vehicles ("UAV"). UAVs, sometimes referred to as "drones," include pilotless aircraft of various sizes and configurations that can be remotely operated by a user or programmed for automated flight. Depending on the specific configurations, the UAVs may be equipped with one or more motors, each with its own ESC that regulates the motor's speed and controls movements of the vehicle. With each additional motor and ESC, the UAV may achieve additional control over its movements.

A quadcopter, for instance, comprises four independent motors each driven by a separate ESC. When compared with a twin-rotor helicopter having two motors, the quadcopter may allow finer adjustments of the vehicle's total thrust as well as the vehicle's angles of rotation, such as its pitch, yaw, and roll. The vehicle's flight altitude, for example, may be controlled by applying equal speed (or thrust) to all four motors and fine-tuning the amount of lift created by each of the four motors. Other movements may be controlled by adjusting the individual speed of the motors. Forward motion (e.g., a forward pitch rotation), for example, may be achieved by driving the aft motors faster or slower than the fore motors; backward motion may be achieved in the opposite manner. Roll motions to move sideways may be controlled by driving the motors on the one side faster or slower than the opposite side, and yaw rotation may be controlled by adjusting the speed of the individual motors. Thus, the ESCs used to control the motors in a UAV ensure the proper flight trajectory and control of the UAV.

A failure within an ESC may potentially present catastrophic problems, especially in UAV deployments. For example, faulty ESCs may behave erratically, causing a UAV to either over-pivot or under-pivot during a maneuver. This may cause the UAV to crash into objects in its flight path. Faulty ESCs also may stop operating completely, which may cause the UAV to lose thrust and fall from the sky. Or, at a minimum, faulty ESCs may create an unstable flight and increase the chance of damaging the UAV and/or injuring people or properties. Accordingly, there is a need for improved reliability in electronic speed control systems that are fast and robust enough to maintain the stability of the system and reduce the risk of injury.

SUMMARY

The disclosed embodiments include methods and systems configured to provide redundant, fault-tolerant ESCs that improve the reliability of electronic speed control systems. The techniques described in the disclosed embodiments may be used to improve stability, reliability, and robustness to any robotic system controlled by electronic speed controllers. The disclosed embodiments provide redundancy by providing a plurality of controllers configured with different driving circuits for the same electric motor. For example, a first controller and second controller may be both configured to generate one or more drive signals to apply to windings of the electric motor. The first and second controllers may use different control methods to drive the electric motor, such as using different waveforms of phase current to drive the electric motor. For example, the first controller may be configured to drive the electric motor by generating one or more drive signals having sinusoidal waveforms, and the second controller may be configured to drive the same electric motor by generating one or more signals having trapezoidal waveforms. The first and second controllers may be used to generate alternative drive signals for the same motor, regardless whether their drive signals are the same or different types of signals.

Further, the disclosed embodiments may select one of the two controllers as a primary controller to drive the electric motor and the other one of the controller as a secondary controller.

The disclosed embodiments may monitor the control of the electric motor. For example, the disclosed embodiments may measure at least one characteristic relating to the control of the electric motor and detect an error condition based on the measurement of the characteristic. In accordance with the disclosed embodiments, the at least one measured characteristic may include a speed of the electric motor or an electrical angle of the electric motor. In one embodiment, both controllers may measure the characteristic of the control of the electric motor. In such an embodiment, the process of detecting an error may comprise comparing the two measurements.

The disclosed embodiments may switch control of the electric motor from the primary controller to the secondary controller if an error condition is detected in the control of the electric motor. In accordance with the disclosed embodiments, the error condition may be one of a hardware error or a software error. In the example of a hardware error, the disclosed embodiments may monitor the status of communications between at least one of the controllers and the electric motor or between at least one of the controllers and a third controller. The hardware error may be detected as a disruption in the communications being monitored or a detected failure in one or more components of one of the controllers. In contrast, the software error may be detected as an inconsistency in the control of the electric motor.

In accordance with the disclosed embodiments, one of the primary or secondary controllers configured to control the electric motor may select which controller will function as the primary controller. Alternatively, a third controller may select which controller will function as the primary controller. Further, in some disclosed embodiments, one of the primary or secondary controllers may monitor at least one characteristic of the control of the electric motor. In other embodiments, a third controller may monitor at least one characteristic of the control of the electric motor.

Further, in some disclosed embodiments, one of the controllers may switch control of the electric motor. For example, one of the primary or secondary controllers may monitor at least one characteristic of the control of the electric motor and switch control of the electric motor to a different controller based on the at least one characteristic of the control of the electric motor. In other embodiments, one of the primary or secondary controllers may monitor at least one characteristic of the control of the electric motor, and the other controller may switch control of the electric motor based on the at least one characteristic of the control of the electric motor. Alternatively, a third controller may switch control of the electric motor.

In the disclosed embodiments, the primary and secondary controllers may be configured to communicate with each other. For example, the two controllers may be configured to communicate directly with each other. In other embodiments, the primary and secondary controllers may be configured to communicate with each other via a third controller. Alternatively, the two controllers may be configured to communicate with a third controller instead of with each other.

In accordance with the disclosed embodiments, the selection of the primary controller may be based on a characteristic of the electric motor. For example, the disclosed embodiments may obtain at least one characteristic of the electric motor and select one of two controllers as the primary controller to drive the electric motor based on the characteristic of the electric motor. For example, in some embodiments, one of the controllers may use sinusoidal waveforms to drive the electric motor and is usually selected as the primary controller, and the other controller may use trapezoidal waveforms to drive the electric motor and is selected as the primary controller when the obtained characteristic of the electric motor exceeds a predetermined value or falls outside of a predetermined range. The at least one characteristic of the electric motor, for example, may include but is not limited to an internal resistance, inductance, magnetic flux, or temperature of the electric motor. In accordance with some disclosed embodiments, the controller using trapezoidal waveforms may be selected as the primary controller when a variation of the obtained characteristic of the electric motor exceeds a predetermined threshold value (in either a positive or negative direction) or falls outside of a predetermined range. For example, a controller that generates trapezoidal waveforms to control the electric motor may be selected as the primary controller when the temperature of the electric motor falls outside of a predetermined range, for example, between 30 to 100 degrees Celsius.

The techniques described in the disclosed embodiments may be performed by any apparatus, system, or article of manufacture, including a movable object such as a UAV, or any other system configured to receive regulate an electric motor using electronic speed controller. Unlike prior electronic speed control systems, the disclosed embodiments provide additional reliability and robustness. It is to be understood that both the foregoing general description and the following detailed description are exemplary and explanatory only and are not restrictive of the disclosed embodiments as defined in the claims.

BRIEF DESCRIPTION OF DRAWINGS

The accompanying drawings, which are incorporated in and constitute a part of this specification, illustrate several embodiments and, together with the description, serve to explain the disclosed principles. In the drawings.

Reference will now be made in detail to exemplary disclosed embodiments, examples of which are illustrated in the accompanying drawings and disclosed herein. Where convenient, the same reference numbers will be used throughout the drawings to refer to the same or like parts.

DETAILED DESCRIPTION

The disclosed embodiments provide redundancy to electronic speed control systems, and more particularly, systems and methods of providing redundancy to electronic speed control systems, such as in UAVs. Unlike prior techniques, the inventive systems and methods use a plurality of ESCs coupled to the same electric motor to provide fast, reliable, and robust motor control to maintain the stability of the electronic speed control systems and reduce the risk of injury.

Figure 1:
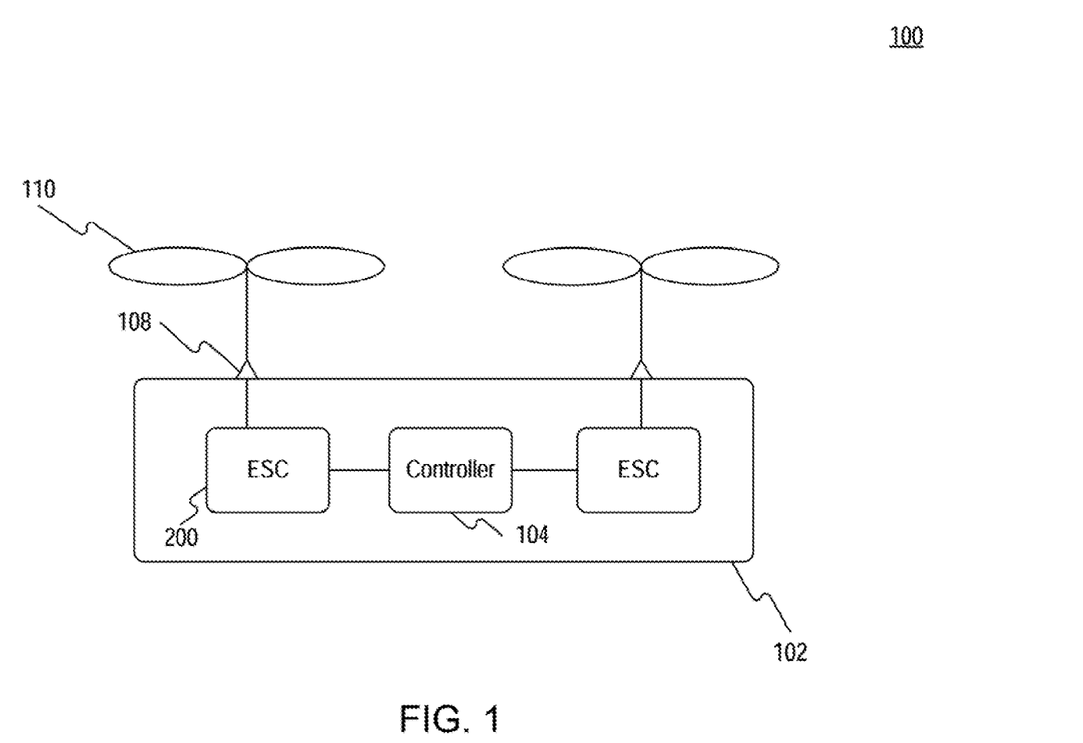
FIG. 1 is a schematic diagram of an exemplary system that may be used to implement redundancy in an electronic speed control system in accordance with the disclosed embodiments.

FIG. 1 is a schematic diagram of an exemplary system 100 for performing one or more operations in accordance with the disclosed embodiments. System 100 may include one or more movable objects 102 of various sizes and configurations. The movable object 102, for example, may be an unmanned aerial vehicle that is movable using one or more motorized propellers 110. Although the movable object 102 is shown and described herein as a UAV for exemplary purposes of this description, it will be understood that other types of movable objects may also be used in embodiments consistent with this disclosure, as long as the movable objects may be configured to be operated and controlled via an electronic control system as described herein. Thus, the movable objects may be wheeled objects (e.g., cars, bicycles, etc.), nautical objects (e.g., boats), aerial objects (e.g., aircrafts, airplanes, helicopters, quadcopters, multicopters, etc.), or the like.

Movable object 102 may include at least one flight controller 104 and one or more ESCs 200 each coupled to an electric motor 108, as shown for example in FIG. 1. The flight controllers 104 may comprise one or more processors, memories, and I/O devices for communicating with other components in the movable object 102 or with components in system 100. For example, the flight controller 104 may be configured to communicate with various components of the movable object 102 including but not limited to an accelerometer, gyroscope, altimeter, proximity sensors, GPS, cameras, etc. The flight controller 104 also may be configured to communicate with other movable objects 102 and/or user controller devices (not shown) in system 100. The flight controller 104 may process various user inputs and/or machine data, and relay them as control signals to the one or more ESCs 200 for regulating the electric motors 108.

As shown in FIG. 1, the ESCs 200 may serve as the interface between the flight controller 104 and electric motors 108. In one aspect of the disclosed embodiments, the specific type of ESC in the movable object 102 may depend on the type of electric motor driven by the ESC. "Brushed ESCs," for example, may be used with brushed motors, and "Brushless ESCs" may be used with brushless motors. The type of ESC may depend on the type of motor commutation. For example, the motors may be self-commutated (e.g., mechanical-commutator motors, electronic-commutator motors, or the like), externally commutated (e.g., asynchronous motors, synchronous motors, or the like), or may be some other special magnetic motors, etc. It is understood that the disclosed embodiments are not limited to the disclosed examples and may use any types of motors and ESCs.

In the disclosed embodiments, the system 100 may provide redundancy by providing at least two ESCs 200 to drive and monitor a single electric motor 108. In some embodiments, the ESCs may be combined in a single, integrated circuit or device, or alternatively the ESCs may be implemented as separate devices configured to be connected to each other. The ESCs may include any hardware or software required to perform the functionality described in the illustrative embodiments described herein. For purposes of illustration and clarity, only one representative ESC 200 is shown for each electric motor 108 in FIG. 1.

Figure 2:
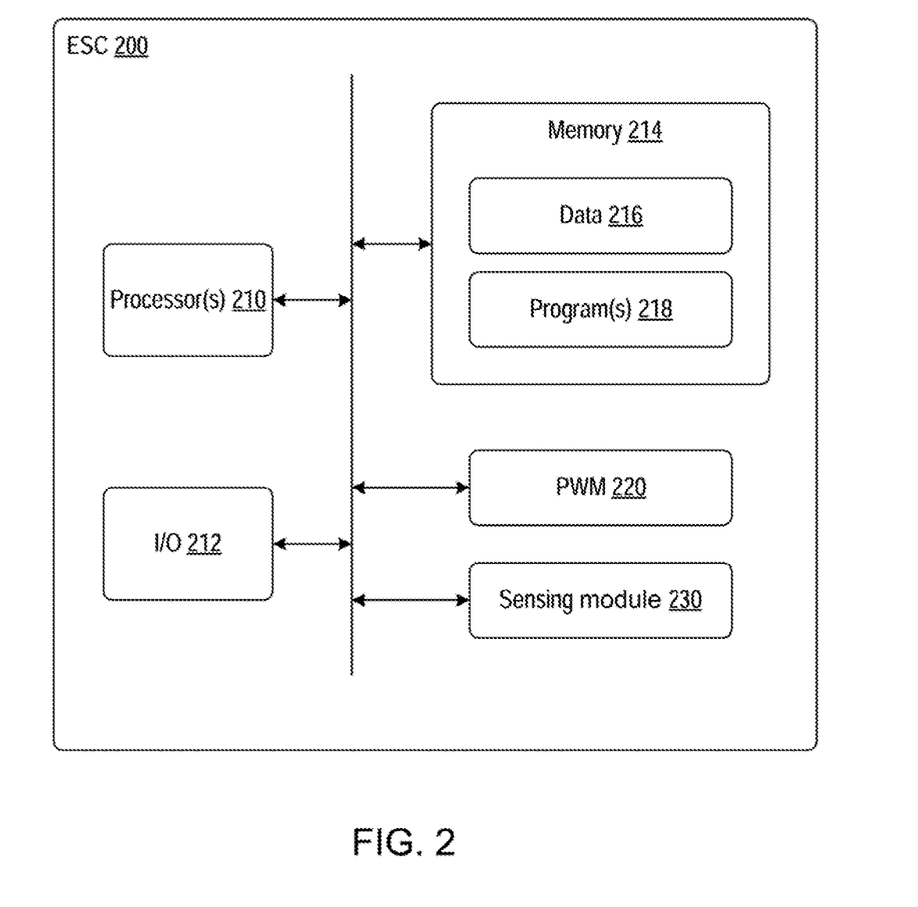
FIG. 2 is a schematic block diagram of an exemplary electronic speed controller that may be used to provide redundancy in an electronic speed control system in accordance with the disclosed embodiments.

FIG. 2 is schematic block diagram of an exemplary ESC 200 that may be used to provide redundancy in an electronic speed control system in accordance with the disclosed embodiments. In some embodiments, for example, the ESC 200 may be integrated into the electric motor 108, and in such embodiments the ESC and electric motor may be deployed as a single unit. In other embodiments, the ESC 200 may be implemented as a separate module or circuit that may be directly or indirectly connected to an electric motor 108.

The ESC 200 may include one or more processors 210, one or more input/output (I/O) devices 212, and one or more memories 214. The ESC also may include one or more buses for routing and directing signals and data between components in the ESC. In some embodiments, the ESC 200 may be configured as a particular apparatus, embedded system, dedicated circuit, or the like, based on the storage, execution, and/or implementation of stored software instructions that perform one or more operations in accordance with the disclosed embodiments. In some embodiments, the ESC 200 may be implemented as a system-on-a-chip ("SoC").

Processor 210 may include one or more known processing devices. In some embodiments, the processor 210 may take the form of, but is not limited to, a microprocessor, embedded processor, or the like. The processor 210 may be integrated in a SoC. For example, the processor may be manufactured by Intel®, Advanced Micro Devices®, Sun®, or any other processor manufacturer or supplier. Alternatively, the processor may be based on the ARM architecture, MIPS architecture, RISC architecture, or the like. In some embodiments, the processor may be a mobile processor. The disclosed embodiments are not limited to any type of processor configured in the ESC 200.

I/O devices 212 may be one or more devices configured to allow data and/or power to be received and/or transmitted by the ESC 200. The I/O devices 212 may include, for example, one or more communication devices and interfaces, digital signal controllers, driving components, sensing components, and any necessary analog-to-digital and/or digital-to-analog converters, that the ESC uses to communicate with other machines, devices, or components in the system 100, including for example, the flight controller 104 and electric motors 108 in movable object 102.

Memory 214 may include one or more storage devices configured to store software instructions executed by the processor 210 to perform functions related to the disclosed embodiments. The memory 214, for example, may be configured to store software instructions, such as one or more software programs 218, that perform operations when executed by the processor 210 to provide redundancy in accordance with the disclosed embodiments. The memory 214 also may be configured to store data 216, for example, for use by the one or more software programs 218.

In some disclosed embodiments, the ESC 200 may further include one or more drive-signal generators, such as pulse-width modulators (PWM) 220, for generating signals to drive an electric motor 108, and one or more sensing modules 230 for obtaining characteristics of an electric motor being monitored by the ESC 200. PWM 220 may use any available modulation techniques including but not limited to delta modulation, delta-sigma modulation, space-vector modulation, direct torque control, field-oriented control, etc. The signals generated from the PWM 220 may enable the ESC 200 to control the electric motor 108.

The sensing modules 230 may include one or more sense devices and/or measurement devices configured to measure various electrical parameters of other components in the system 100, such as the electric motors 108. The sensing modules 230 also may receive various information from other components in the system 100, including but not limited to the flight controller 104, other ESCs 200, and electric motors 108, among others. PWM 220 and sensing modules 230 may be implemented as software, hardware, or any combination thereof.

Figure 3A:
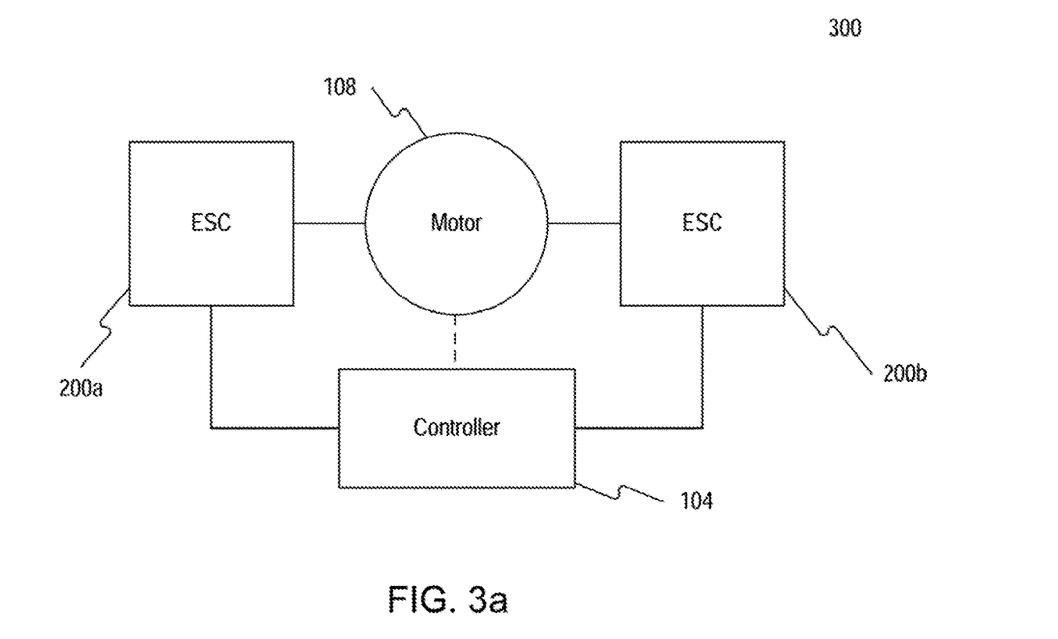
FIGS. 3a-3b are schematic block diagrams of additional exemplary systems that may be used to provide redundancy in an electronic speed control system in accordance with the disclosed embodiments.
Figure 3B:
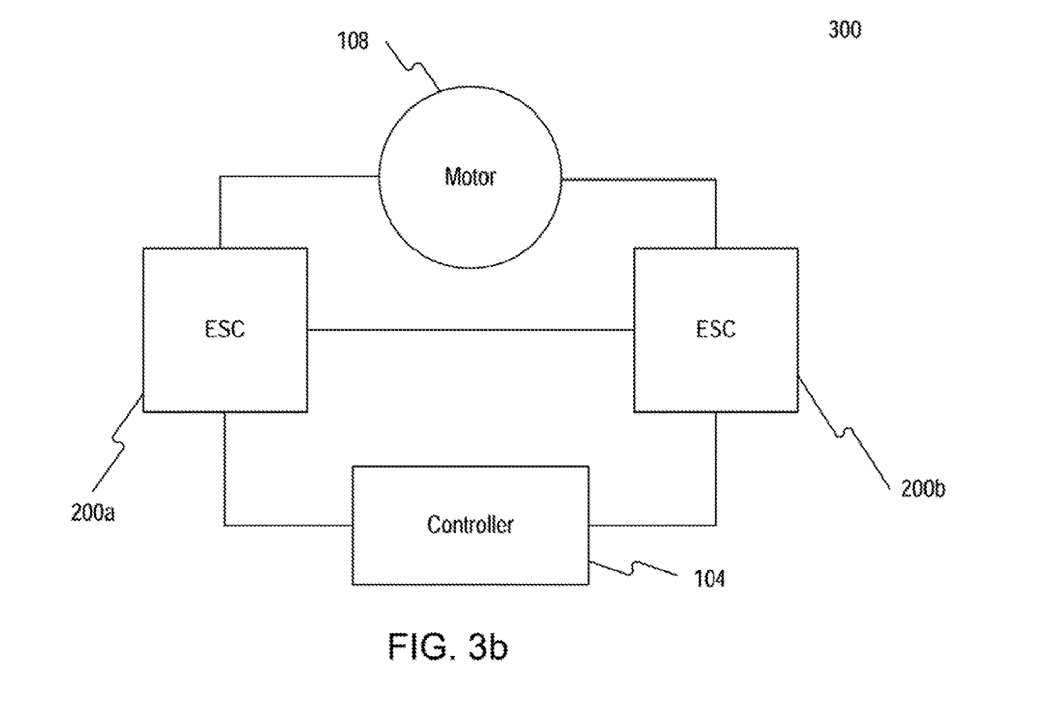

FIGS. 3a and 3b are schematic block diagrams of different potential configurations of an exemplary system 300 that may be used to provide redundancy in an electronic speed control system in accordance with the disclosed embodiments. As shown in both figures, system 300 includes multiple ESCs, such as 200a and 200b, which may be configured to control the same electric motor 108. In accordance with the disclosed embodiments, the system 300 may be implemented in one or more components in the system 100, such as in the UAV 102, for performing one or more operations consistent with the disclosed embodiments. The components of the system 300 may be implemented by the exemplary ESC 200 illustrated in FIG. 2.

In some disclosed embodiments, as shown in FIG. 3a, the ESCs 200a and 200b may be configured to communicate with a flight controller 104. In such embodiments, the ESCs 200a and 200b may communicate with each other via the flight controller 104. Alternatively, as shown in FIG. 3b, the ESCs 200a and 200b may communicate directly with each other. In some embodiments, the ESCs 200a and 200b may be individual modules as shown in FIGS. 3a and 3b; in other embodiments, the ESCs 200a and 200b may be integrated into a single module, such as shown in FIG. 1. It is to be understood that the examples and descriptions in the system 300 have been arbitrarily defined herein for the convenience of the description, and that the system 300 may utilize more than two ESCs for providing redundancy to the electric speed control system.

In accordance with the disclosed embodiments, the flight controller 104 may receive instructions from the user and/or data from various onboard sensors in the movable object 102, convert the received instructions and data into control signals, and relay the control signals to one or more of the ESCs 200a and 200b for regulating the electric motor 108. In some embodiments, the ESCs 200a and 200b may convert the control signals received from the flight controller 104 into one or more suitable electrical currents to drive the electric motor 108. The electrical currents may comprise signal waveforms of various shapes, including but not limited to sinusoidal, trapezoidal, square, sawtooth, or the like. The shape of waveform may also depend on the specific type of electric motor 108 used in the UAV 102, for example, based on the back-electromagnetic field (back EMF) generated by the electric motor.

In the exemplary system 300, the electric motor 108 may comprise any type of motor, including but not limited to, various permanent magnet motors such as a brushless DC motor (BLDC), permanent magnet synchronous motor (PMSM), or the like. The BLDC motor and PMSM are similar to each other, and both may have a permanent magnet rotor and windings on the stator. The main difference between the two motors, however, is the back EMF waveforms of their motor windings. In the PMSM, the back EMF is sinusoidal, while the back EMF for the BLDC motor is trapezoidal. In one aspect of the disclosed embodiments, the ESCs 200a and 200b may apply drive-signal waveforms having a shape that matches the type of back-EMF waveform corresponding to the motor's windings, to improve efficiency and control of the motor. For example, an ESC may control a BLDC motor using trapezoidal drive-signal waveforms, while another ESC may control a PMSM using sinusoid waveforms.

Accordingly, there are various techniques for providing redundancy to the system 300 in accordance with the disclosed embodiments. One possible technique, for example, may be to configure the system 300 with duplicate ESCs. Thus, if one ESC fails, the other ESC may operate as a backup or fail-safe. In such an example, the ESCs 200a and 200b may be of the same type and/or contain copies of the same hardware and software for controlling the motor 108.

Another possible technique for providing redundancy, for example, may be to provide functional redundancy, such that ESCs 200a and 200b provide different functional alternatives for driving the motor 108. By using two or more ESCs 200a and 200b of different functional types, the system 300 may protect against the possibility of the same ESC types failing at the same time. For example, certain types of ESCs may be more adversely affected by electromagnetic interference than other types of ESCs. For example, if a UAV 102 equipped with multiple ESCs of the same type were to fly near a base station (e.g., a cell phone tower), the electromagnetic field generated by the base station could disrupt or otherwise interfere with the operation of all the ESCs in the UAV 102 in the same way at the same time. Accordingly, in some embodiments, the system 300 may be configured with redundant ESCs belonging to different functional groups to provide functional redundancy. In such embodiments, the system 300, for example, may be configured with one or more ESCs capable of driving sinusoid waveforms and one or more ESCs capable of driving trapezoidal waveforms. In some embodiments, two or more ESCs in the system 300 may operate using different commutation techniques, including but not limited to field oriented control (e.g., vector control), sinusoidal commutation, six-step commutation, etc. By providing an electric motor 108 with two or more ESCs with different functional implementations, for example different drive-signal shapes and/or commutations, the system 300 may provide redundancy protection against failures caused by environmental electromagnetic interference, signal noise, physical obstructions, or the like, by allowing control of the motor to change from one type of ESC to a different type of ESC.

In the system 300, each of the ESCs 200a and 200b may be classified as a primary ESC or a secondary ESC for purposes of discussion and not limitation. For example, the primary ESC 200a may be configured to provide a set of drive signals that energize windings in the electric motor 108, thereby driving the rotation of the motor. The secondary ESC 200b, for example, may operate primarily as a monitor for detecting potential errors within the electronic speed controller system. As discussed in some embodiments below, the primary ESC 200a may become a secondary ESC and vice versa. In the disclosed embodiments, only one ESC functions as the primary ESC to drive the motor 108, but one or more other ESCs or other controllers may function as the secondary ESC to monitor and detect errors in the system. For example, as shown by the dotted line in FIG. 3a, the flight controller 104 may function as the monitor for detecting potential errors in the system 300, in which case the flight controller 104 would perform the same monitoring functions described below in connection with secondary ESC 200b. In yet other possible embodiments, the primary ESC 200a may generate the drive signals for the motor 108 and concurrently monitor the system 300 for potential errors in the same manner described below in the exemplary embodiment where the secondary ESC 200b performs such monitoring and error-detecting functionality.

In the embodiment shown in FIG. 3b, the ESCs 200a and 200b may communicate directly with each other to provide various information such as control information, motor measurements, or the like. Thus, when the primary ESC 200a is providing power to drive the rotation of the electric motor 108, the secondary ESC 200b may monitor the motor's characteristics for any errors. In some embodiments, the ESCs 200a and 200b each may function as an independent monitor of the system 300 whenever they are acting as the secondary ESC. In some embodiments, the ESCs 200a and 200b may further comprise internal monitors (e.g., in the sensing modules 230), which may allow each ESC to monitor its own status. For example, if the primary ESC 200a detects a potential error in the system 300 as it is generating drive signals for the motor 108, the primary ESC may relinquish control of the electric motor and direct the secondary ESC 200b to drive the electric motor 108 instead.

The primary ESC 200a may, for example, transmit a signal or message to the secondary ESC 200b to notify the secondary ESC that the primary ESC has detected an error and/or is relinquishing control. In response, the secondary ESC may apply its locally generated drive signals to the electric motor 108, essentially changing its status from a secondary ESC to a primary ESC. In some disclosed embodiments where the ESCs 200a and 200b are not in direct communication, such as shown in FIG. 3a, the secondary ESC 200a may be notified that it should provide drive signals to the motor 108 based on a signal or message that it receives from the flight controller 104 or from another component in the system 300. In yet other embodiments, the secondary ESC 200b may detect an error in the electronic speed control system and notify the primary ESC 200a that the primary ESC 200a should relinquish control of driving the electric motor 108. In such embodiments, the secondary ESC 200b may send a signal or message directly to the primary ESC 200a (e.g., as shown in FIG. 3b) or indirectly to the primary ESC 200b via the flight controller 104 or through other components (e.g., as shown in FIG. 3a).

Each ESC 200 also may include an internal monitor that enables it to perform self-diagnosis after detecting an error in the electronic speed control system 300. The self-diagnosis may allow the ESCs 200a and 200b to conduct internal fault assessments, calibrations, or the like, to ensure that the ESCs 200a and 200b are operating properly.

In some embodiments, as shown in FIG. 3a, the ESCs 200a and 200b may communicate the control signals and motor measurements to the flight controller 104. In such embodiments, the flight controller 104 may operate as a monitor for detecting potential errors within the electronic speed controller system 300, as shown by the dotted line in FIG. 3a. In a further aspect, the flight controller 104 may also act as an independent monitor and may directly measure the condition of the electric motor 108 in lieu of or in addition to the secondary ESC.

It is to be understood that the configurations and boundaries of the functional building blocks shown for exemplary systems 100 and 300 have been arbitrarily defined herein for the convenience of the description. Alternative implementations may be defined so long as the specified functions and relationships thereof are appropriately performed and fall within the scope and spirit of the invention.

Figure 4:
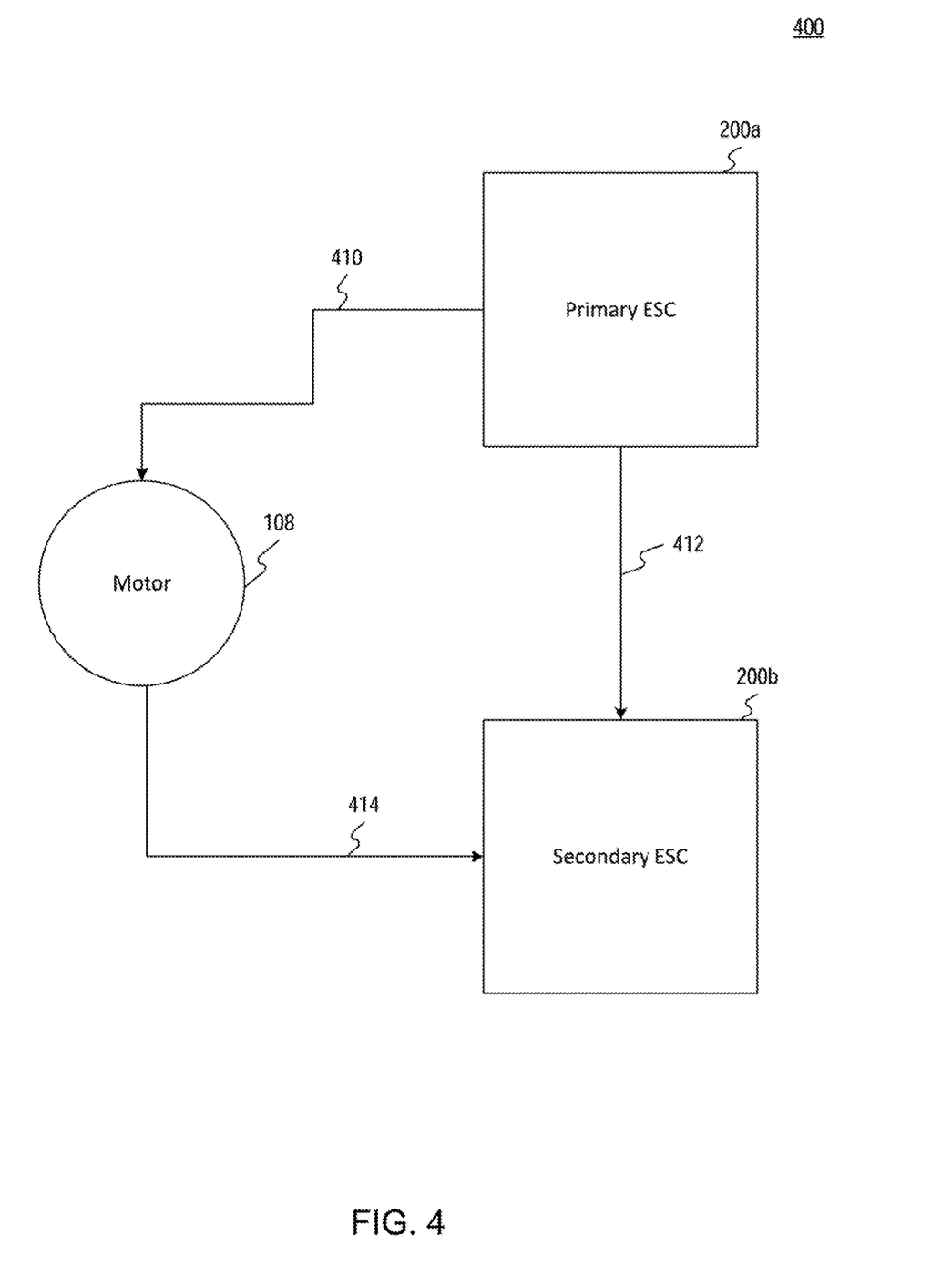
FIG. 4 is a schematic block diagram illustrating an exemplary system that may be used to provide redundancy in an electronic speed control system in accordance with the disclosed embodiments.
Figure 5:
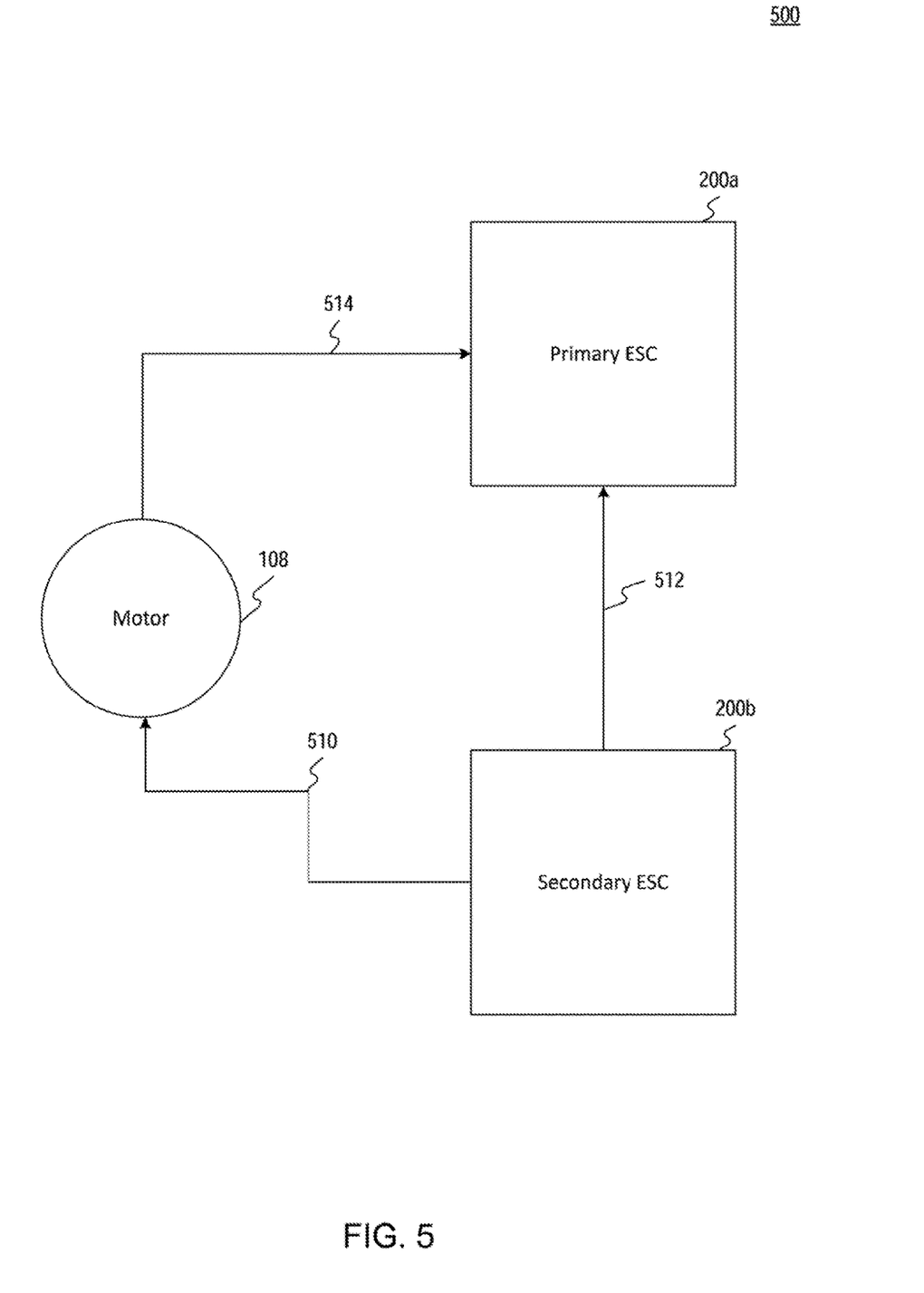
FIG. 5 is a schematic block diagram illustrating another exemplary sequence of steps that may be performed for providing redundancy in an electronic speed control system in accordance with the disclosed embodiments.

FIGS. 4 and 5 are schematic block diagrams illustrating exemplary processes 400 and 500 for providing redundancy to an electronic speed control system in accordance with the disclosed embodiments. The processes of FIGS. 4 and 5 may be implemented in software, hardware, or any combination thereof. For purposes of explanation and not limitation, the processes 400 and 500 will be described in the context of exemplary system 300, such that the disclosed process may be performed by software executing in the ESC 200a, ESC 200b, and/or flight controller 104.

In some embodiments, the system 300 may provide at least two ESCs 200a and 200b for every electric motor 108. As noted above, in the exemplary disclosed embodiments the ESC 200a may be the primary ESC, and the ESC 200b may be the secondary ESC. In some embodiments, the primary ESC 200a may be the primary ESC for driving the electric motor 108 at step 410. In such embodiments, the primary ESC 200a may use any suitable signal waveforms or commutation techniques to drive the electric motor 108, including but not limited to field oriented control such as space-vector-pulse-width modulation. The primary ESC 200a may also communicate various control information to the secondary ESC 200b at step 412, including information related to the voltages, currents, frequencies, phases, etc. of the drive signals that the primary ESC 200a applies to the electric motor 108 at step 410.

Acting as an independent monitor, the secondary ESC 200b also may sense one or more characteristics of the electric motor 108 at step 414 to measure, for example, voltages or currents of the drive signals applied to the motor's windings and/or the position, speed, acceleration, torque, angle, electrical angle, etc. of the electric motor. Further, one or more other characteristics of the electric motor may be monitored by the ESCs, including an internal resistance, inductance, magnetic flux, or temperature of the electric motor. Alternatively, the ESCs may monitor the status of communications between the controllers and the electric motor or communication between the controllers and a third controller. Those skilled in the art will understand that the secondary ESC may obtain its measured set of one or more motor characteristics directly by sensing and/or sampling certain signals associated with the motor 108 or indirectly via various sensors, or by deriving the one or more characteristics from other measured characteristics obtained from sensed or sampled signals.

The secondary ESC may compare the control information it received at step 410 with the motor measurements that it obtains at step 414 to determine if an error has occurred. For example, if there is any environmental electromagnetic interference to the back EMF, physical obstruction to the propeller, signal noise, or any faults within the primary ESC 200a, the motor measurements may be inconsistent with the received control information, which may result in an error condition.

In accordance with the disclosed embodiments, the error condition may be one of a hardware error or a software error. For example, an inconsistency in the operation of the electric motor may be due to a software error. Alternatively, where there is a disruption in the communications being monitored or a failure in components of the primary controller, the detected error condition may be due to a hardware error.

In some embodiments, the secondary ESC 200b may generate an error signal or value based on a comparison of the set of measured motor characteristics and an expected set of motor characteristics that the secondary ESC 200b may determine, at least in part, from the control information it receives from the primary ESC 200a. In some embodiments, the secondary ESC may determine an error condition exists if its calculated error signal or value exceeds a predetermined threshold level (in either a positive or negative direction) or is outside an acceptable range of values, or if a threshold level or acceptable range of values has been exceeded for more than a predetermined period of time. After detecting an error, the secondary ESC 200b may direct the primary ESC 200a to relinquish its control over driving the electric motor 108, and the secondary ESC 200b may take control of the electric motor 108 to generate the motor's drive signals.

After the secondary ESC 200b has taken control of the electric motor 108, the role of each ESC 200a and 200b may switch. As shown in FIG. 5, the secondary ESC 200b may drive the electric motor 108 at step 510. The primary ESC 200a may now act as the monitor for the system 300. In accordance with the exemplary embodiments disclosed above, the secondary ESC 200b and primary ESC 200a may be configured to operate using different drive-signal waveforms or commutation techniques. For example, the secondary ESC 200b may drive the electric motor 108 using trapezoidal waveforms or a six-step commutation technique, which were not used by the primary ESC 200a before the detected error condition. By configuring the two ESC 200a and 200b according to different functional types, the system 300 may provide redundancy protection from losing effectiveness of both ESCs at the same time.

In some embodiments, the secondary ESC 200b may provide its control information to the primary ESC 303 at step 512 similar to exemplary process 400. In such embodiments, the primary ESC 200a may sense or sample characteristics of the electric motor 108 at step 514, for example, to measure the motor voltages, currents, position, speed, acceleration, torque, etc., as previously described. The primary ESC 200a may then compare the control information received at step 510 and its motor measurements obtained at step 514 to determine if an error has occurred, for example, based on a predetermined threshold level, acceptable range of values, and/or time period as described above. After detecting an error, the primary ESC 200a may direct the secondary ESC 200b to release control of the electric motor 108, for example by sending a signal or message to notify the secondary 200b, and the primary ESC 200a may take back control of driving the motor 108.

In some embodiments, the ESCs 200a and 200b may conduct self-diagnosis to conduct internal fault assessments while monitoring the status of the system 300. The fault assessments may allow the ESCs 200a and 200b to determine if the original error was caused by external sources or caused by the ESC itself. If the error was caused by external sources, the ESCs 200a and 200b may be able to recovery control of the electric motor 108. If the error was not caused by external sources, the ESCs 200a and 200b may continue to operate as a monitor for the system 300, or in some embodiments, the ESCs 200a and 200b may try to perform basic recovery procedures, including but not limited to restarting itself, calibrating its components, or the like.

In accordance with the disclosed embodiments, the ESCs may also select which one of the two controllers will function as the primary controller to drive the electric motor based on the characteristic of the electric motor. In such embodiments, the controllers may select a new primary controller when the obtained characteristic of the electric motor is highly variable. For example, the controller using sinusoidal waveforms may be usually selected as the primary controller, such as by default, and the controller using trapezoidal waveforms may be selected as the primary controller when the obtained characteristic of the electric motor varies greatly, such as more than a predetermined amount. In such embodiments, the characteristic of the electric motor may include an internal resistance, inductance, magnetic flux, temperature, etc. of the electric motor, and the selection of the controller using trapezoidal waveforms may occur when the variation of the obtained characteristic of the electric motor exceeds a predetermined value or falls outside a predetermined range. For example, the controller using trapezoidal waveforms may be selected as the primary controller when the temperature of the electric motor falls outside a predetermined range, such as 30 to 100 degrees Celsius. In such embodiments, the system 300 may switch between the two ESCs based on the characteristics of the electric motor and/or actual flight condition.

Figure 6:
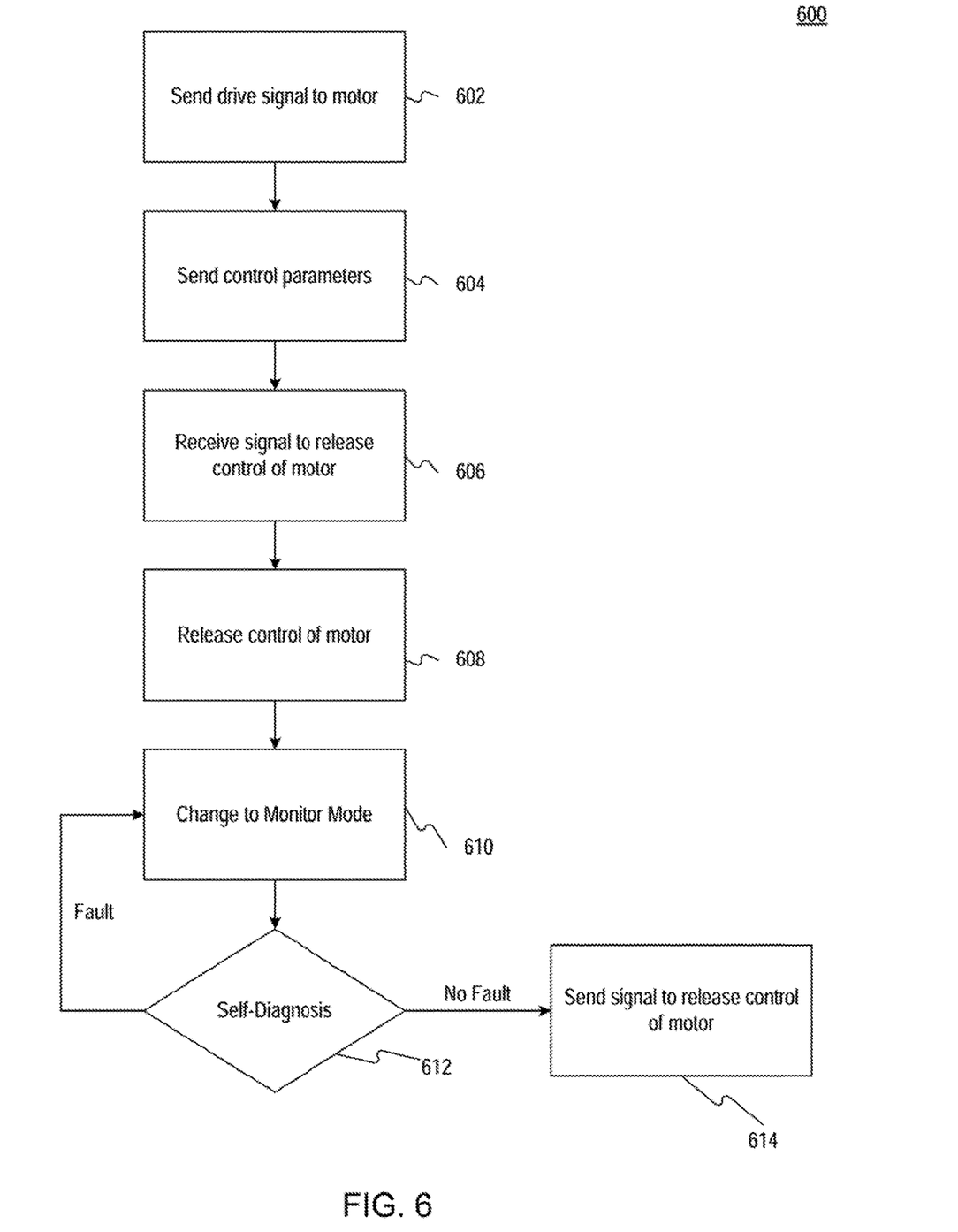
FIG. 6 is a flowchart illustrating an exemplary sequence of steps that may be performed for controlling an electric motor in a redundant electronic speed control system in accordance with the disclosed embodiments.

FIG. 6 shows a flowchart illustrating a sequence of steps that performs an exemplary process 600 for controlling an electric motor in a redundant electronic speed control system in accordance with the disclosed embodiments. The process of FIG. 6 may be implemented in software, hardware, or any combination thereof. For purposes of explanation and not limitation, the process 600 will be described in the context of system 300, such that the disclosed process may be performed by software executing in the primary ESC 200a during normal operation or in the secondary ESC 200b during redundancy operation.

In the system 300, the flight controller 104 may receive inputs from various sources. When user-controlled, for example, the flight controller 104 may receive instructions from a user controller operated by the user. During autonomous flight, the flight controller 104 may also receive data from various onboard devices in the UAV 102 such as accelerometer, gyroscope, altimeter, proximity sensors, GPS, cameras, etc. The flight controller 104 may process the received instructions and data, and convert them into control signals. The control signals are then send to the ESCs 200a and 200b for controlling the electric motor 108.

During normal operation, the primary ESC 200a may process the control signals into suitable currents to drive the electric motor 108 at step 602. Depending on the electric motor type (e.g., BLDC, PMSM, or the like), the primary ESC 200a may be configured to drive the electric motor using trapezoidal, sinusoidal, or any suitable waveforms, preferably matching the back-EMF characteristics of the electric motor 108. In some embodiments, the primary ESC 200a and secondary ESC 200b may be configured to operate using different waveforms, for example, the primary ESC 200a may be configured to drive the electric motor using sinusoidal waveforms while the secondary ESC 200a may be configured to drive the electric motor using trapezoidal waveforms, or vice versa.

During operation, the primary ESC 200a may send its control information to various other components of system 300 at step 604. In some embodiments, the control information may be sent to the secondary ESC 200b, which is acting as a monitoring device for the system 300. Alternatively, the control information may be sent to the flight controller 104, which may also act as a monitoring device for the system 300. Additional details related to exemplary process for monitoring the system status are illustrated in FIG. 7.

In some embodiments, the primary ESC 200a may continue to control the electric motor 108 until it receives a signal from one of the monitoring devices (e.g., secondary ESC 200b and/or flight controller 104) requesting it to release control over driving the motor 108, at step 606. For example, while the primary ESC 200a is controlling the electric motor 108, the secondary ESC 200b and/or flight controller 104 may be monitoring the system 300 for possible errors. The primary ESC 200a may also be configured to monitor the system 300 for errors. If any of these devices monitoring the system 300 detect an error condition, the device may request the primary ESC 200a to release control of the electric motor 108 and/or may request that the secondary ESC 200b take control of generating the drive signals for the electric motor 108.

At step 608, the primary ESC 200a may release control of the electric motor. In this way, the system 300 may prevent a faulty primary ESC 200a from further controlling the electric motor 108. At step 610, the primary ESC 200a may change its operational mode from a "drive mode," e.g., where it generates drive signals for the electric motor 108, to a "monitor mode," e.g., where it monitors certain motor characteristics to determine whether there is an error condition in connection with another ESC driving the motor 108. In some embodiments, at step 612, the primary ESC 200a may conduct one or more self-diagnosis checks to analyze if the error while it was driving the motor 108 was generated due to an internal fault or an external source. If the primary ESC 200a can determine the error was generated due to an external source, the primary ESC 200a may try to restart itself at step 614 and send a signal or message requesting that it regain drive control of the electric motor 108. If the primary ESC 200a either cannot determine the source for the error, or determined that there is an internal fault, the primary ESC 200a may remain in its monitoring mode at step 612. During the monitoring mode, the primary ESC 200a may act as a secondary ESC for monitoring the status of the system 300.

Figure 7:
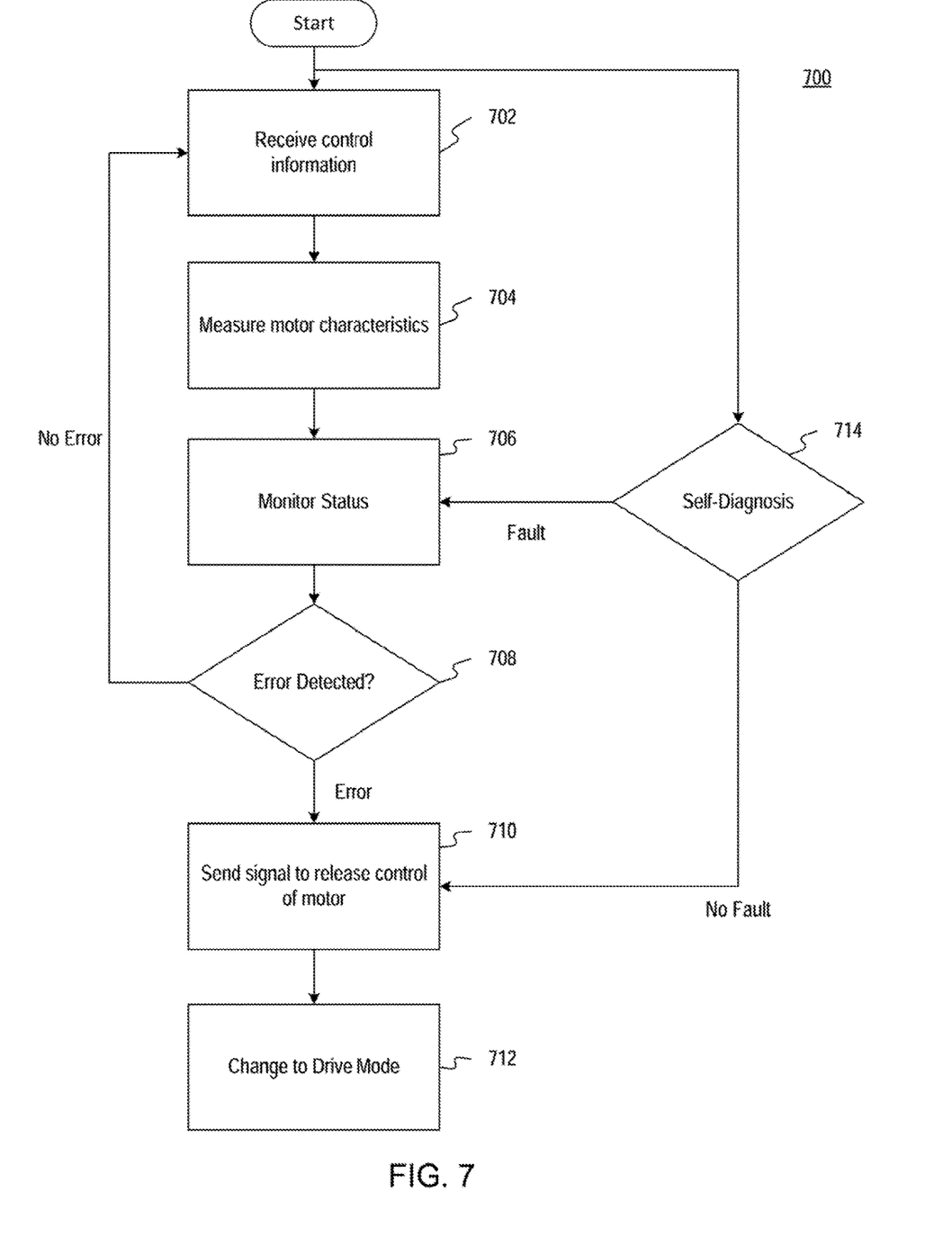
FIG. 7 is a flowchart illustrating an exemplary sequence of steps that may be performed for monitoring system status in a redundant electronic speed control system in accordance with the disclosed embodiments.

FIG. 7 shows a flowchart illustrating a sequence of steps that performs an exemplary process 700 for monitoring system status in a redundant electronic speed control system in accordance with the disclosed embodiments. The process of FIG. 7 may be implemented in software, hardware, or any combination thereof. For purposes of explanation and not limitation, the process 700 will be described in the context of system 300, such that the disclosed process may be performed by software executing in the secondary ESC 200b during normal operation, in the primary ESC 200a during redundancy operation, or in the flight controller 104 as an independent monitor. As such, any one of the two ESCs may monitor the control of the electric motor, or the flight controller may monitor the control of the electric motor.

In the system 300, the secondary ESC 200b may be used to enable error detection and redundancy protection. In accordance to the disclosed embodiments, the secondary ESC 200b may receive control information from the primary ESC 200a at step 702. For example, the control information may include various parameters such as driving voltages, currents, phases, frequencies, etc. In some embodiments, the secondary ESC 200b may also receive the control information from the flight controller 104 at step 702. In such embodiments, the secondary ESC 200b may use the control information to determine a set of expected motor characteristics that may be used as a baseline for error detection.

In some embodiments, the secondary ESC 200b may also measure the motor characteristics by sampling signals associated with the electric motor 108 and/or deriving measurements based on the sampled signals, at step 704. For example, the secondary ESC 200b may measure electrical characteristics such as the output currents, voltages, phases, frequencies, back EMF, etc., or other information related to the electric motor 108 such as the rotor position, angle, electric angle, etc. Using the control information and motor measurements, the secondary ESC 200b may monitor the status of the system 300 by comparing the motor measurements with the control information at step 706. For example, the secondary ESC 200b may determine the expected motor characteristics based on the control information from the primary ESC 200a and/or control signals from the flight controller 104. In such an example, the secondary ESC 200b may determine whether the motor measurements obtained for the electric motor 108 are within an acceptable range relative to the expected motor characteristics or if there is an abnormal deviation from the expected motor characteristics.

If the secondary ESC 200b determines that an error has not been detected at step 708, the secondary ESC 200b may continue to monitor the system status by returning to step 702. If, on the other hand, the secondary ESC 200b determines that an error has been detected, the secondary ESC 200b may transmit a signal or message to the primary ESC 200a, at step 710, to instruct the primary ESC 200a to release its drive control of the electric motor 108 and/or to restart. This may enable the system 300 to disconnect a potentially faulty primary ESC from the electric motor 108.

After the primary ESC 200a releases control of the electric motor 108, the secondary ESC 200b may change to a "drive mode" at step 712 to take control of driving the electric motor 108 and prevent any gaps in control of the electric motor 108. After the switch to secondary ESC 200b is completed, the secondary ESC 200b may drive the electric motor 108 while the primary ESC 200a may monitor the system 300.

Those skilled in the art will understand that in accordance with the disclosed embodiments, it is possible for any one of the two ESCs to monitor or switch control of the electric motor. For example, the ESC monitoring the control of the electric motor may switch control of the electric motor, or alternatively, while one ESC may monitor the control of the electric motor, the other ESC may switch control of the electric motor. Further, it is also possible for the flight controller to monitor and/or switch controller of the electric motor.

In some embodiments, the ESC or other controller monitoring the system status, for example using the process 700, may further conduct self-diagnosis to analyze if the ESC may have an internal fault at step 714. For example, if the primary ESC 200a is monitoring the system status, for example, the primary ESC 200a may perform various self-diagnosis to determine whether the ESC is operating in its normal condition. In another aspect, the primary ESC 200a may determine that the error was due to an external source. In such an aspect, the primary ESC 200a may try to regain control of the electric motor 108 by sending a signal or message, which may include for example a restart signal, to the secondary ESC 200b which is generating the drive signals for the electric motor 108. In a further aspect of the disclosed embodiments, if the primary ESC 200a determines that it is faulty based on one or more self-diagnosis checks at step 714, the primary ESC 200a may continue to operate as a monitor. In some embodiments, the primary ESC 200a may conduct various recovery procedures such as restarting itself, calibrating its components, or the like.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. It is to be understood that the examples and descriptions in this disclosure have been arbitrarily defined herein for the convenience of the description. The disclosed systems and methods are not limited to these simplified examples, and other features and characteristics may be considered so long as the specified functions are appropriately performed.

While certain disclosed embodiments have been discussed with respect to UAVs for purposes of discussion, one skilled in the art will appreciate the useful applications of disclosed methods and systems for identifying target objects. Furthermore, although aspects of the disclosed embodiments are described as being associated with data stored in memory and other tangible computer-readable storage mediums, one skilled in the art will appreciate that these aspects can be stored on and executed from many types of tangible computer-readable media. Further, certain processes and steps of the disclosed embodiments are described in a particular order, one skilled in the art will appreciate that practice of the disclosed embodiments are not so limited and could be accomplished in many ways. Accordingly, the disclosed embodiments are not limited to the above-described examples, but instead are defined by the appended claims in light of their full scope of equivalents.

What is claimed is:

1. A method for driving an electric motor, comprising:
providing two controllers, including a first controller and a second controller, for driving the electric motor, the two controllers using different control methods to drive the electric motor, the first controller being configured to drive the electric motor with a drive signal having a sinusoidal waveform, and the second controller being configured to drive the electric motor with the drive signal having a trapezoidal waveform;
monitoring a control of the electric motor, the control of the electric motor being performed by a primary controller or a secondary controller;
selecting, in response to a characteristic parameter of the electrical motor exceeding a threshold value or falling outside of a range, the second controller as the primary controller to drive the electric motor and the first controller as the secondary controller;
selecting, in response to the characteristic parameter of the electrical motor not exceeding the threshold value and not falling outside of the range, the first controller as the primary controller to drive the electric motor and the second controller as the secondary controller; and
switching the control of the electric motor from the primary controller to the secondary controller if an error condition is detected in the control of the electric motor.

2. The method of claim 1, wherein:
monitoring the control comprises monitoring a status of a communication between the two controllers and the electric motor or between the two controllers and a third controller, and the error condition includes a hardware error causing a disruption in the communication or a failure in components of the primary controller; or
the error condition includes a software error including an inconsistency in at least one characteristic of the control of the electric motor.

3. The method of claim 1,
wherein monitoring the control comprises measuring at least one characteristic of the control of the electric motor;
the method further comprising:
detecting the error condition based on the measurement of the at least one characteristic.

4. The method of claim 3, wherein measuring the at least one characteristic comprises measuring the at least one characteristic by both of the controllers in two measurements, and detecting the error condition comprises comparing the two measurements.

5. The method of claim 3 wherein the at least one characteristic includes at least one of a speed of the electric motor or an electrical angle of the electric motor.

6. The method of claim 1, wherein:
a third controller monitors the at least one characteristic of the control of the electric motor and selects one of the two controllers as the primary controller.

7. The method of claim 1, wherein:
a third controller switches the control of the electric motor.

8. The method of claim 1, wherein the two controllers are configured to communicate with each other directly or via a third controller.

9. The method of claim 1, wherein the two controllers are configured to communicate with a third controller.

10. A system for driving an electric motor, comprising:
two controllers, including a first controller and a second controller, for driving the electric motor, wherein the two controllers use different control methods to drive the electric motor, the first controller is configured to drive the electric motor with a drive signal having a sinusoidal waveform, the second controller is configured to drive the electric motor with the drive signal having a trapezoidal waveform, and the system is configured to:
monitor a control of the electric motor, the control of the electric motor being performed by a primary controller or a secondary controller;
select, in response to a characteristic parameter of the electrical motor exceeding a threshold value or falling outside of a range, the second controller as the primary controller to drive the electric motor and the first controller as the secondary controller;
select, in response to the characteristic parameter of the electrical motor not exceeding the threshold value and not falling outside of the range, the first controller as the primary controller to drive the electric motor and the second controller as the secondary controller; and
switch the control of the electric motor from the primary controller to the secondary controller if an error condition is detected in the control of the electric motor.

11. The system of claim 10, wherein:
the two controllers are further configured to monitor a status of a communication between the two controllers and the electric motor or between the two controllers and a third controller, and the error condition includes a hardware error causing a disruption in the communication or a failure in components of the primary controller; or
the error condition includes a software error including an inconsistency in at least one characteristic of the control of the electric motor.

12. The system of claim 10, wherein the two controllers are further configured to:
measure at least one characteristic of the control of the electric motor; and
detect the error condition based on the measurement of the at least one characteristic.

13. The system of claim 12, wherein the two controllers are further configured to:
measure the at least one characteristic in two measurements, respectively; and
detect the error condition by comparing the two measurements.

14. The system of claim 12, wherein the at least one characteristic includes at least one of a speed of the electric motor or an electrical angle of the electric motor.

15. The system of claim 10, wherein:
a third controller monitors the at least one characteristic of the control of the electric motor and selects which one of the two controllers as the primary controller.

16. The system of claim 10, wherein:
a third controller switches the control of the electric motor.

17. The system of claim 10, wherein the two controllers are configured to communicate with each other directly or via a third controller.

18. The system of claim 10, wherein the two controllers are configured to communicate with a third controller.

19. The method of claim 1, wherein the first controller and the second controller use different commutations in the drive signal.

20. The method of claim 1, wherein the characteristic parameter of the electrical motor includes one or more of: an internal resistance of the electric motor, an inductance of the electric motor, a magnetic flux of the electric motor, and a temperature of the electric motor.

\* \* \* \* \*